United States Patent Office 3,123,122
Patented Mar. 3, 1964

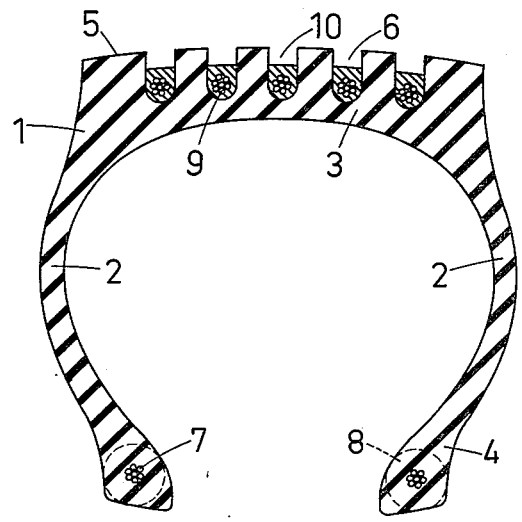
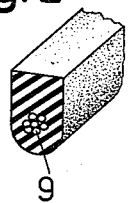
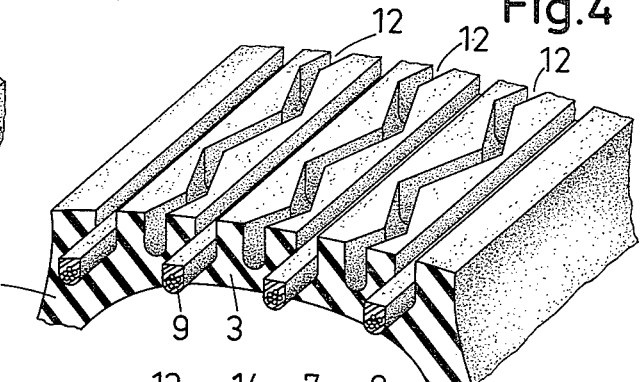
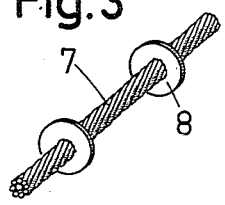
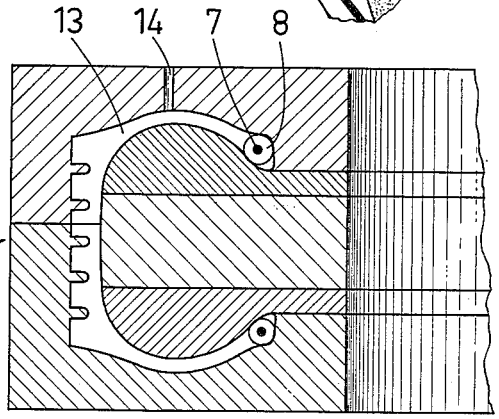

3,123,122
PNEUMATIC TIRE WITH REINFORCEMENT IN ZENITH PORTION THEREOF
Richard Beckadolph, Hannover, Germany, assignor to Continental Gummi-Werke Aktiengesellschaft, Hannover, Germany
Filed Dec. 19, 1960, Ser. No. 76,768
Claims priority, application Germany Dec. 21, 1959
2 Claims. (Cl. 152—330)

The present invention relates to a pneumatic tire of rubber or rubber-like synthetic material which is provided with a reinforcement in the form of pull-resistant cords, bands, or the like in the crown or zenith portion of the tire.

Tires of the above mentioned general character are known which, however, have the drawback that certain difficulties are inherent to their construction with regard to the embedding and anchoring of the reinforcements in the crown or zenith portion of the tire.

It is, therefore, an object of the present invention to provide a pneumatic tire of the above mentioned general character, which will overcome the above outlined drawbacks.

It is another object of this invention to improve said heretofore known pneumatic tires with reinforcements in the crown or zenith portion of the tire so as to facilitate the construction thereof.

These and other objects and advantages of the invention will appear more clearly from the following specification in connection with the accompanying drawing, in which:

FIG. 1 is a section through a pneumatic tire according to the present invention.

FIG. 2 illustrates in section a portion of a reinforcement for the tire of FIG. 1.

FIG. 3 is a section of a core ring for the tire of FIG. 1.

FIG. 4 is a partial section of a pneumatic tire with a crown modified somewhat over that of the tire shown in FIG. 4.

FIG. 5 is a partial section through a mold for making a tire according to the present invention.

The tire according to the present invention is characterized primarily in that the tire body surrounding the air chamber and comprising the bead portion, the side walls and the crown or zenith portion, is aside from the possibly provided pull-resistant annular cores in the tire beads produced as a unit by itself and consists exclusively of rubber or rubber material, whereas the reinforcements likewise separately produced in the form of cords, bands, or the like are detachably connected to the tire body. Preferably, the reinforcements are arranged in circumferential grooves of the tire body so that they are positively held therein and that a firm anchoring of the reinforcements in the tire bodies will be obtained due to the pressing effect caused by the tire inner pressure.

Furthermore, it is advantageous to design the reinforcements as endless pull-resistant rings so that the forces occurring during the driving, preferably the occurring lateral forces, but simultaneously also the inflating forces caused by the inner pressure of the tire and the centrifugal forces, will be properly absorbed by said reinforcements.

According to a further suggestion of the present invention, the cords, bands or the like are not employed as uncovered bodies but are embedded in rubber or rubber material. In this connection it is particularly advantageous to adapt the cross section of the annular body consisting of rubber or rubber material and the cords, bands, or the like to the cross section of the grooves of the tire body.

Even though it is possible that the reinforcements with their cover layers extend into the tread surface, preferably the cross section of the reinforcements with the cover layers is so dimensioned that the reinforcements will fill in a portion only of the circumferential grooves so that above said reinforcements grooves remain in the tire body the edges of which may be employed for forming the tread profile.

Referring now to the drawing in detail, the tire body 1 consisting of rubber or rubber-like synthetic material and provided with lateral walls 2, a crown or zenith portion 3, and tire beads 4, has a tread surface 5 with a plurality of circumferential grooves 6 arranged alongside each other. Embedded in the beads 4 are annular pull-resistant cores 7 which preferably consist of steel wires. These cores 7 are provided with circumferentially distributed and spaced protrusions preferably in the form of transverse discs of harder material, for instance hard rubber. These protrusions or discs extend at several places into the outer surface of the tire body 1 or the beads 4 thereof. Thus, disregarding the cores 7 with the discs 8, the tire body 1 consists exclusively of the above mentioned elastically deformable materials.

For purposes of reinforcing the tire body in its crown or zenith portion 3, there are provided annular steel cables 9 placed in grooves 6 and embedded in rubber or rubber material while forming a cross section corresponding to the cross section of grooves 6. The height of this cross section is furthermore so selected that above the cables 9 there remain free spaces 10. The inner diameter of the reinforcements inserted into grooves 6 is so dimensioned that a firm positive connection with the tire body 1 will be obtained and the anchoring of said reinforcements will additionally be improved by the tire inner pressure or the tendency of the crown or zenith portion 3 to arch toward the outside. Thus, the cables 9 will determine the shape of the tread surface 5 while undesired deformations and relative movements of the tread surface 5 will be avoided when transverse forces, for instance when driving through a curve, will occur.

In order to increase the gripping property of the tread surface 5, in conformity with FIG. 4 zigzag grooves 12 as provided between the circumferential grooves 6. These zigzag grooves 12 are provided during the manufacture of the tire body.

The present invention yields the possibility to produce a vehicle tire in a particularly simple manner. This may be accomplished by a mold, generally designated M, according to FIG. 5 of any desired design the hollow chamber 13 of which corresponds to the shape of the tire body 1. The discs 8 acting as spacer members serve for embedding and journalling the tire cores 7. The said discs 8 rest against the walls of the mold chamber 13 and thus secure the desired location of the core rings 7 within the mold chamber 13. Preferably, the tire body 1 is formed in a mold according to FIG. 5 in its condition of flow into the chamber 13. To this end, inlet openings 14 may be provided which are advantageously distributed over the circumference of the mold M. It is, of course, to be understood that the mold in conformity with known injection molding procedures may be provided with the required means, such as pistons or the like, for pressing the material into the mold.

After the tire body 1 has been molded in mold M, and provided a vulcanizable material has been employed, the tire will be subjected in a manner known per se to pressure and heat for effecting a vulcanization. After the finish vulcanized tire body has been removed from mold M, the tire body obtained will then have the shape of the tire of FIG. 1. It is then merely necessary to provide said tire body 1 with cables 9 which can be inserted in a simple manner into the circumferential grooves 6 when the tire body 1 is not yet under filling pressure.

It is, of course, to be understood that the present invention is, by no means, limited to the particular constructions shown in the drawing but also comprises any modifications within the scope of the appended claims. It is also to be understood that the term "rubber material" as it appears in the present specification and appended claims includes natural as well as synthetic rubber and rubber-like material.

What I claim is:

1. A pneumatic street vehicle tire of rubber material having a carcass-free tire body with pull resistant cores, which includes a tread section integral with said tire body and having its outer periphery provided with annular grooves located in planes substantially perpendicular to the axis of rotation of said tire and distributed over the major portion of the width of said tread section, a plurality of endless belt means with an outer surface of rubber material and with pull resistant inserts therein, said belt means being formed by individual belts separate from the tire body and respectively located in said grooves, said belts having substantially plane side surfaces in engagement with the sides of said grooves along substantially the entire side surfaces of said belts, each of said belts having substantially the width of the respective annular groove in which it is located, the outer periphery of said belt means being set back radially inwardly with regard to the outer periphery of said tread section so that the side walls of said grooves together with the outer periphery of said belt means confine free annular grooves.

2. A pneumatic tire according to claim 1, in which the free annular grooves confined by the side walls of said first mentioned annular grooves and the periphery of said belt means are sharp-edged.

References Cited in the file of this patent

UNITED STATES PATENTS

| | | |
|---|---|---|
| 1,293,528 | Palmer | Feb. 4, 1919 |
| 1,827,668 | Musselman | Oct. 13, 1931 |
| 2,612,461 | Hallgren | Sept. 30, 1952 |
| 2,691,335 | Murray | Oct. 12, 1954 |
| 2,874,742 | Lugli | Feb. 24, 1959 |
| 2,902,072 | Reuter | Sept. 1, 1959 |
| 2,925,623 | Beckadolph | Feb. 23, 1960 |

FOREIGN PATENTS

| | | |
|---|---|---|
| 789,770 | Great Britain | Jan. 29, 1958 |